United States Patent
Bian et al.

(10) Patent No.: US 10,816,872 B1
(45) Date of Patent: Oct. 27, 2020

(54) TUNABLE GRATING COUPLERS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/516,658

(22) Filed: Jul. 19, 2019

(51) Int. Cl.
*G02F 1/313* (2006.01)
*G02F 1/295* (2006.01)

(52) U.S. Cl.
CPC ............ *G02F 1/3132* (2013.01); *G02F 1/295* (2013.01); *G02F 2201/302* (2013.01)

(58) Field of Classification Search
CPC ... G02F 1/3132; G02F 1/295; G02F 2201/302
See application file for complete search history.

(56) References Cited

U.S. PATENT DOCUMENTS

| | | | |
|---|---|---|---|
| 4,006,963 A | 2/1977 | Baues et al. | |
| 5,579,143 A | 11/1996 | Huber | |
| 6,356,674 B1 | 3/2002 | Davis et al. | |
| 6,821,457 B1 | 11/2004 | Natarajan et al. | |
| 9,519,163 B2 * | 12/2016 | Zheng | G02F 1/025 |
| 10,101,630 B2 * | 10/2018 | Watts | G02B 6/1223 |

OTHER PUBLICATIONS

J. Kim et al., "Tunable Grating Couplers for Broadband Operation Using Thermo-Optic Effect in Silicon," in IEEE Photonics Technology Letters, vol. 27, No. 21, pp. 2304-2307, 1 Nov. 1, 2015.
Alok P. Vasudev, Ju-Hyung Kang, Junghyun Park, Xiaoge Liu, and Mark L. Brongersma, "Electro-optical modulation of a silicon waveguide with an "epsilon-near-zero" material," Opt. Express 21, 26387-26397 (2013).

* cited by examiner

*Primary Examiner* — Ryan A Lepisto
(74) *Attorney, Agent, or Firm* — Thompson Hine LLP; Francois Pagette

(57) ABSTRACT

Structures for a grating coupler and methods of fabricating a structure for a grating coupler. The grating coupler includes a first plurality of grating structures and a second plurality of grating structures that alternate with the first plurality of grating structures in an interleaved arrangement. The first plurality of grating structures are composed of a dielectric material or a semiconductor material. The second plurality of grating structures are composed of a tunable material having a refractive index that changes with an applied voltage.

20 Claims, 7 Drawing Sheets

TUNABLE GRATING COUPLERS

BACKGROUND

The present invention relates to photonics chips and, more specifically, to structures for a grating coupler and methods of fabricating a structure for a grating coupler.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components into the unified platform.

Grating couplers are commonly used in photonics chips for coupling optical signals between waveguides and optical fibers. In general, grating couplers are fixed optical elements having an optical performance that cannot be tuned, switched, or configured.

Improved structures for a grating coupler and methods of fabricating a structure for a grating coupler are needed.

SUMMARY

In an embodiment of the invention, a structure for a grating coupler includes a first plurality of grating structures and a second plurality of grating structures alternating with the first plurality of grating structures in an interleaved arrangement. The first plurality of grating structures are composed of a dielectric material or a semiconductor material. The second plurality of grating structures are composed of a tunable material having a refractive index that changes with an applied voltage.

In an embodiment of the invention, a method of forming a grating coupler is provided. A layer is patterned to define a first plurality of grating structures and a plurality of grooves alternating with the first plurality of grating structures. A second plurality of grating structures are formed that alternate with the first plurality of grating structures in an interleaved arrangement. Each of the second plurality of grating structures is positioned within one of the grooves. The second plurality of grating structures are comprised of a tunable material having a refractive index that changes with an applied voltage.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
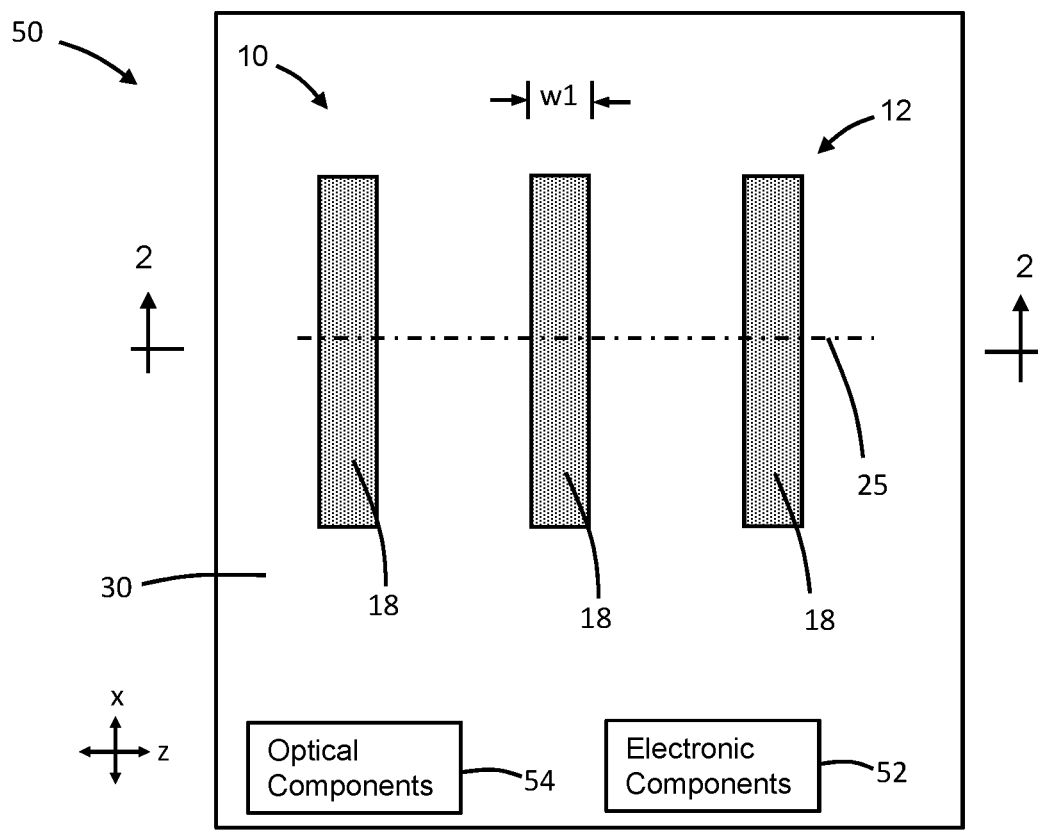
FIG. 1 is a top view of a photonics chip including a structure at an initial fabrication stage of a processing method in accordance with embodiments of the invention.
Figure 2:
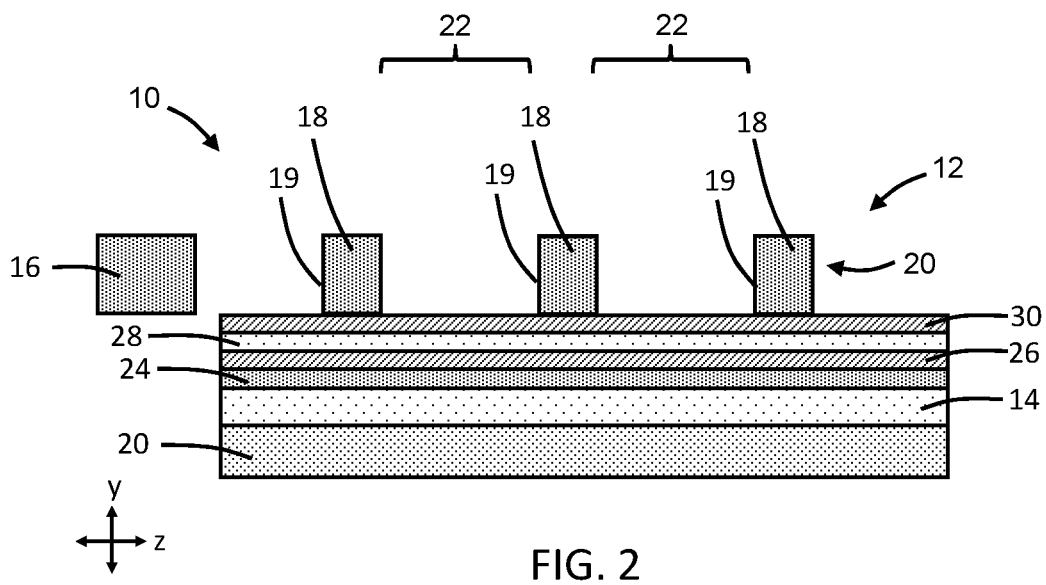
FIG. 2 is a cross-sectional view of the structure taken generally along line 2-2 in FIG.

With reference to FIGS. 1, 2 and in accordance with embodiments of the invention, a structure 10 includes a grating coupler 12 and a waveguide 16 that is located adjacent to the grating coupler 12. The grating coupler 12 and waveguide 16 are positioned over a set of layers 14, 24, 26, 28, 30. The layer 14 may be composed of a dielectric material, such as silicon dioxide. For example, the dielectric layer 14 may be a buried insulator layer of a silicon-on-insulator (SOI) wafer from which a section of the device layer has been fully removed. The SOI wafer further includes a substrate 20 composed of a single-crystal semiconductor material and arranged below the dielectric layer 14. In use, the waveguide 16 may route a stream of optical signals to the grating coupler 12.

Layers 24, 26, 28, 30 are positioned between the dielectric layer 14 and the grating coupler 12. The layers 24, 28 may be composed of respective dielectric materials formed by, for example, atomic layer deposition. In an embodiment, the layer 24 may be composed of silicon dioxide, and the layer 28 may be composed of silicon nitride. The layers 26, 30 may be composed of respective conductors formed by, for example, atomic layer deposition. In embodiments, the layers 26, 30 may be composed of doped polysilicon, tungsten, indium-tin oxide, vanadium oxide, or a combination thereof.

The dielectric layer 24 is positioned in direct contact with the dielectric layer 14, and the conductor layer 26 is positioned in direct contact with the dielectric layer 24. The dielectric layer 28 is positioned between the conductor layer 26 and the conductor layer 30. The conductor layer 30 is positioned over the dielectric layer 28, and the conductor layer 26 is positioned under the dielectric layer 28.

The grating coupler 12 includes an arrangement of grating structures 18 that are separated by notches or grooves 22. The grooves 22 are trenches that may extend to the dielectric layer 14 to define respective spaces or gaps that are arranged between adjacent pairs of the grating structures 18. The grating structures 18 are spaced apart along an axis 25 (e.g., the z-axis in the x-z plane) with the grooves 22 intervening between adjacent grating structures 18 such that the grating structures 18 and grooves 22 alternate along the axis 25. In an embodiment, the grating structures 18 may be arranged as a group of spaced-apart parallel line shapes having given dimensions (e.g., width, w1, and length) and a pitch determined in part by the width of the grooves 22. In an alternative embodiment, the grating structures 18 and grooves 22 may be arranged as a group of concentric arc shapes that are nested together and that have given dimensions (e.g., width and arc length).

The grating structures 18 may have a given periodicity along the axis 25 defined by a pitch and a filling factor or duty cycle relating to their dimensions. The pitch represents a distance along the axis 25 between adjacent pairs of the grating structures 18, and the duty cycle represents a fraction of the total area of the grating coupler 12 that is occupied by the grating structures 18 as opposed to grooves 22. In an alternative embodiment, the grating structures 18 of the grating coupler 12 may be apodized (i.e., aperiodic) with a pitch along the axis 25 that varies as a function of position.

The grating structures 18 may be formed by depositing a uniform layer of a material and patterning the deposited layer with lithography and etching processes to define the grooves 22. To that end, the layer is deposited, an etch mask is formed by a lithography process over the deposited layer, and unmasked sections of the deposited layer are etched and removed with an etching process, such as reactive ion etching. The etching process may be selected to stop on the material of the conductor layer 30 after penetrating fully through the deposited dielectric layer. In an embodiment, the grating structures 18 may be composed of a dielectric material, such as silicon nitride, that is deposited by chemical vapor deposition. The deposited layer may be annealed, prior to patterning, to reduce the hydrogen content of its material. The waveguide 16 may be composed of the same material as the grating structures 18 of the grating coupler 12, and may be concurrently patterned from the same deposited layer.

The grating structures 18 may directly contact the conductor layer 30, and the grating structures 18 may include side surfaces in the form of sidewalls that intersect the conductor layer 30. In the representative embodiment, the grating structures 18 are depicted as rectangular shapes and the sidewalls 19 may extend vertically or substantially vertically relative to the conductor layer 30. However, in alternative embodiments, the grating structures 18 may be trapezoidal with sidewalls 19 tapering from top to bottom, trapezoidal with sidewalls 19 having inverse tapering (i.e., flaring) from top to bottom, or otherwise non-rectangular sidewalls 19 (e.g., rounded sidewalls).

Figure 3:
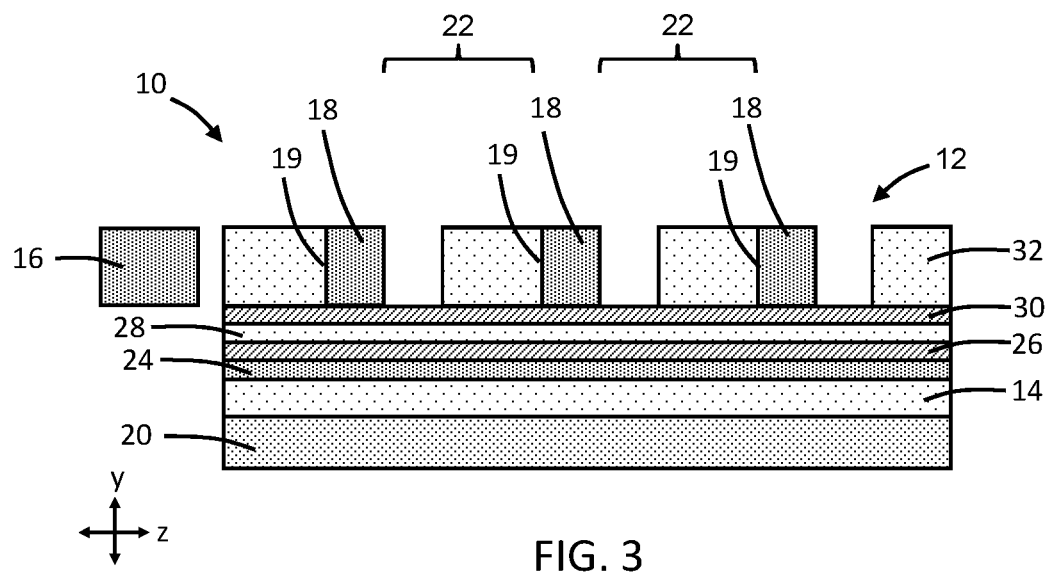
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 32 is deposited by, for example, atomic layer deposition over the grating structures 18 and planarized by chemical-mechanical polishing to be coplanar or substantially coplanar with a top surface of the grating structures 18. The dielectric layer 32 may be composed of a dielectric material (e.g., silicon dioxide), and the polishing may remove topography induced in the dielectric layer 32 by deposition over the grating structures 18 and grooves 22. The dielectric layer 32 is patterned with lithography and etching processes to open a portion of each groove 22. To that end, an etch mask is formed by a lithography process over the grating structures 18 and dielectric layer 32 and an etching process, such as reactive ion etching, is used to remove unmasked dielectric material from the portion of each groove 22. A masked portion of the dielectric material of the dielectric layer 32 remains inside each groove 22. The etching process may be selected to stop on the material of the conductor layer 30 after penetrating fully through the dielectric layer 32. The opened portions of the grooves 22 may overlap with the grating structures 18 such that one of the sidewalls 19 of each grating structure 18 is exposed, and an opposite sidewall 19 of each grating structure 18 is covered by a residual portion of the patterned dielectric layer 32

Figure 4:
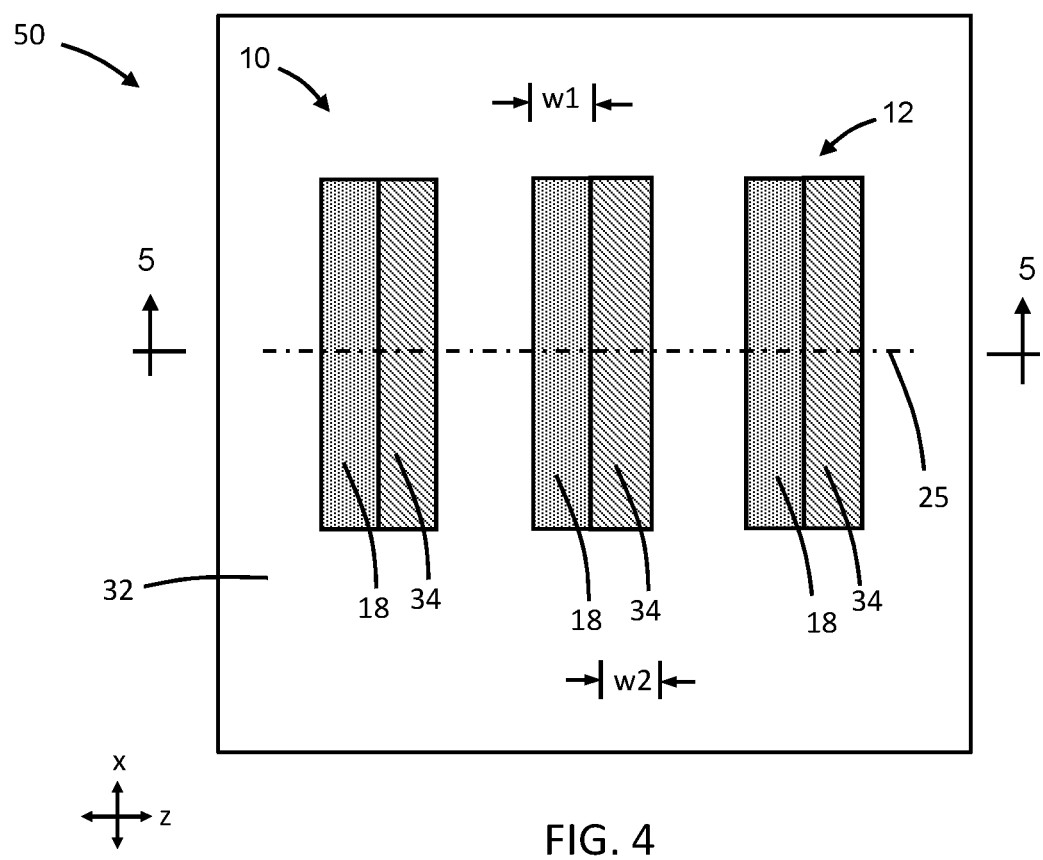
FIG. 4 is a top view of the structure at a fabrication stage subsequent to FIG. 3.
Figure 5:
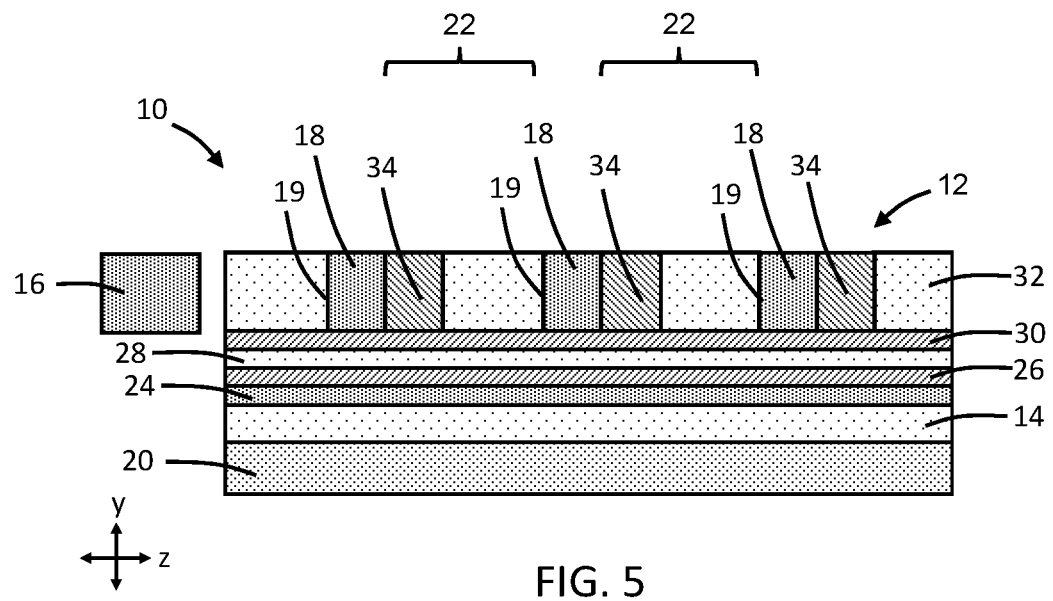
FIG. 5 is a cross-sectional view of the structure taken generally along line 5-5 in FIG. 4.

With reference to FIGS. 4, 5 in which like reference numerals refer to like features in FIG. 3 and at a subsequent fabrication stage, the grating coupler 12 further includes grating structures 34 that are formed inside the opened portions of the grooves 22. The grating structures 34 may be systematically arranged along the axis 25 to one sidewall 19 of the grating structures 18, and the grating structures 34 may be in direct contact with respective sidewalls 19 of the grating structures 18. The grating structures 34 and the grating structures 18 effectively define a set of hybrid or composite grating structures in the form of ridges each composed of a pair of different materials. Portions of the dielectric layer 32 are positioned in the spaces between adjacent ridges. The grating structures 18, the grating structures 34, and the dielectric layer 32 are coplanar or substantially coplanar at their top and bottom surfaces to provide a uniform or substantially uniform thickness for the grating coupler 12. The grating structures 34 are interleaved with the grating structures 18 along the axis 25 such that the grating structures 18 and the grating structures 34, which are composed of different materials, alternate along the axis 25.

The grating structures 34 may have a width, w2, and the ridges of the composite grating structures may have a width equal to the sum of the width, w1, of the grating structure 18 and the width, w2, of the grating structure 34 in each adjoining pair of grating structures 18, 34. In an embodiment, the grating structures 18 and the grating structures 34 may have equal or substantially widths. The grating structures 34 may have a length or arc length that is equal or substantially equal to the length or arc length of the grating structures 18.

The grating structures 34 may be deposited by atomic layer deposition or chemical vapor deposition and polished with chemical-mechanical polishing to be coplanar or substantially coplanar with the grating structures 18 and the surrounding dielectric layer 32. In an embodiment, the grating structures 34 may be composed of a conductor with a variable index of refraction (i.e., refractive index) that can be varied as a function of an applied bias voltage. In an embodiment, the grating structures 34 may be composed of indium-tin oxide (ITO). In an embodiment, the grating structures 34 may be composed of another type of inorganic tunable material, such as vanadium oxide or germanium-antimony telluride, a combination of these materials, or a combination of one or both of these materials with indium-tin oxide. In an embodiment, the conductor layer 30 may be composed of the same material as the grating structures 34.

The grating coupler 12 is tunable because the material properties of the grating structures 34 provide a refractive index that can be varied by the application of a bias voltage. The refractive index of the material of the grating structures 34 can be varied with the applied bias voltage to effectively switch the grating coupler 12 between different states for diffracting optical signals at different wavelengths. In one state (e.g., no applied bias voltage), the material of the grating structures 34 may have a high refractive index and exhibit low optical signal absorption such that the grating coupler 12 has a transmission spectrum characterized by a peak wavelength with optimum coupling efficiency. In another state (e.g., an applied bias voltage), the material of the grating structures 34 may have a high refractive index and exhibit low optical signal absorption such that the grating coupler 12 has a transmission spectrum characterized by a different peak wavelength with optimum coupling efficiency. For example, the peak wavelength for optimum coupling efficiency may exhibit a shift of 10 nanometers to 50 nanometers between the two different states of the grating coupler 12.

In an alternative embodiment, the grating structures 18 may be formed of the tunable material (e.g., indium-tin oxide), and the grating structures 34 may be formed from the dielectric material (e.g., silicon nitride) and formed after the grating structures 18.

Figure 6:
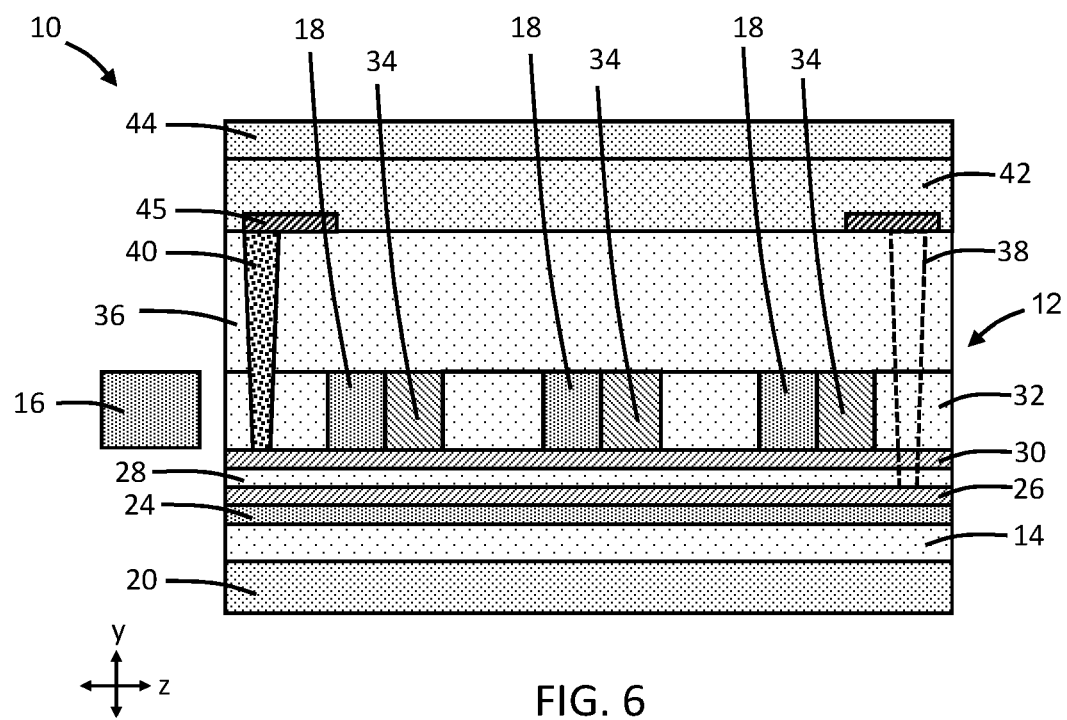
FIG. 6 is a cross-sectional view of the structure at a fabrication stage subsequent to FIG. 5.

With reference to FIG. 6 in which like reference numerals refer to like features in FIG. 5 and at a subsequent fabrication stage, a dielectric layer 36 is formed over the grating structures 18, dielectric layer 32, and grating structures 34. The dielectric layer 36 may be composed of a dielectric material deposited by chemical vapor deposition. For example, the dielectric layer 36 may be composed of silicon dioxide deposited by chemical vapor deposition using ozone and tetraethylorthosilicate (TEOS) as reactants.

Contacts 38, 40 are formed in the dielectric layer 36. The contact 38 extends in a contact opening defined in the dielectric layer 36 to couple to the conductor layer 26 and provide an electrical connection. The contact opening may be lined with a dielectric material to isolate the contact 38 from the conductor layer 30. The contact 40 extends in a contact opening defined in the dielectric layer 36 to couple to the conductor layer 30 and provide another electrical connection. The contacts 38, 40 may be composed of a metal, such as tungsten, copper, or cobalt.

A back-end-of-line stack 42 is formed by back-end-of-line processing over the dielectric layer 36. The back-end-of-line stack 42 may include one or more interlayer dielectric layers composed of one or more dielectric materials, such as carbon-doped silicon dioxide, and metallization composed of, for example, copper, tungsten, and/or cobalt that is arranged in the one or more interlayer dielectric layers. An optional cladding layer 44 composed of a dielectric material, such as silicon nitride, may be deposited over the back-end-of-line stack 42.

The contact 38 connects the conductor layer 26 with a wire 45 in the back-end-of-line stack 42, and the contact 40 connects the conductor layer 30 with another wire 45 in the back-end-of-line stack 42. Through these connections, an adjustable and/or switchable bias voltage may be applied from the back-end-of-line stack 42 to the conductor layers 26, 30 for providing the different states of the grating coupler 12. As discussed hereinabove, the applied bias voltage changes the permittivity and refractive index of the grating structures 34 such that the peak wavelength in the transmission spectrum of the grating coupler 12 is adjustable and tunable.

The grating coupler 12 is active in that the diffracted spectrum is tunable through the application of a bias potential. The ability to enable tunable coupling efficiency and a reconfigurable transmission spectrum may permit a single structure 10 to operate with optimal coupling efficiencies at different wavelengths and/or be used to compensate for a possible wavelength shift induced by fabrication imperfections. The ability to shift the wavelength transmitted through the grating coupler 12 may permit a single structure 10 to be used on photonics chips in which the optical components handle multiple wavelengths, such as in association with wavelength-division multiplexing.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

With reference to FIG. 6 in which like reference numerals refer to like features in FIG. 5 and in accordance with alternative embodiments of the invention, the structure 10 may be modified to reposition the conductor layer 30 to a location over the grating structures 18 and grating structures 34. The conductor layer 30 is deposited after forming the grating structures 34 and may be in direct contact with planar top surfaces of the grating structures 18, 34. Due to the repositioning of the conductor layer 30, the grating structures 18, 34 are arranged between the conductor layer 26 and the conductor layer 30.

Figure 7:
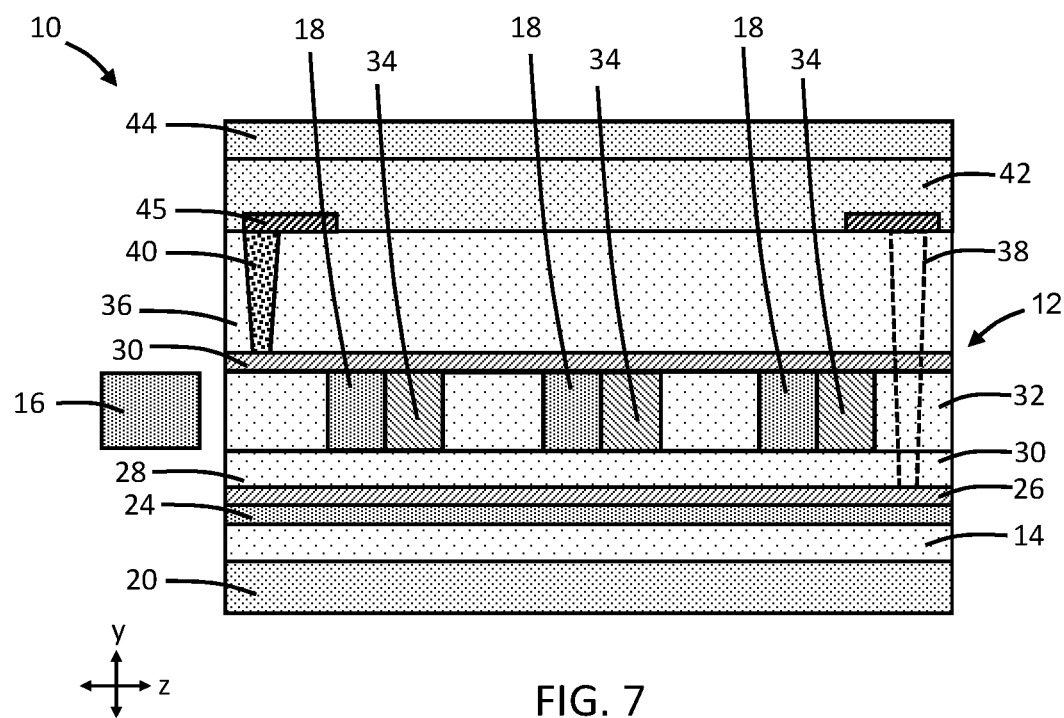
FIGS. 7-10 are cross-sectional views of structures in accordance with alternative embodiments.
Figure 8:
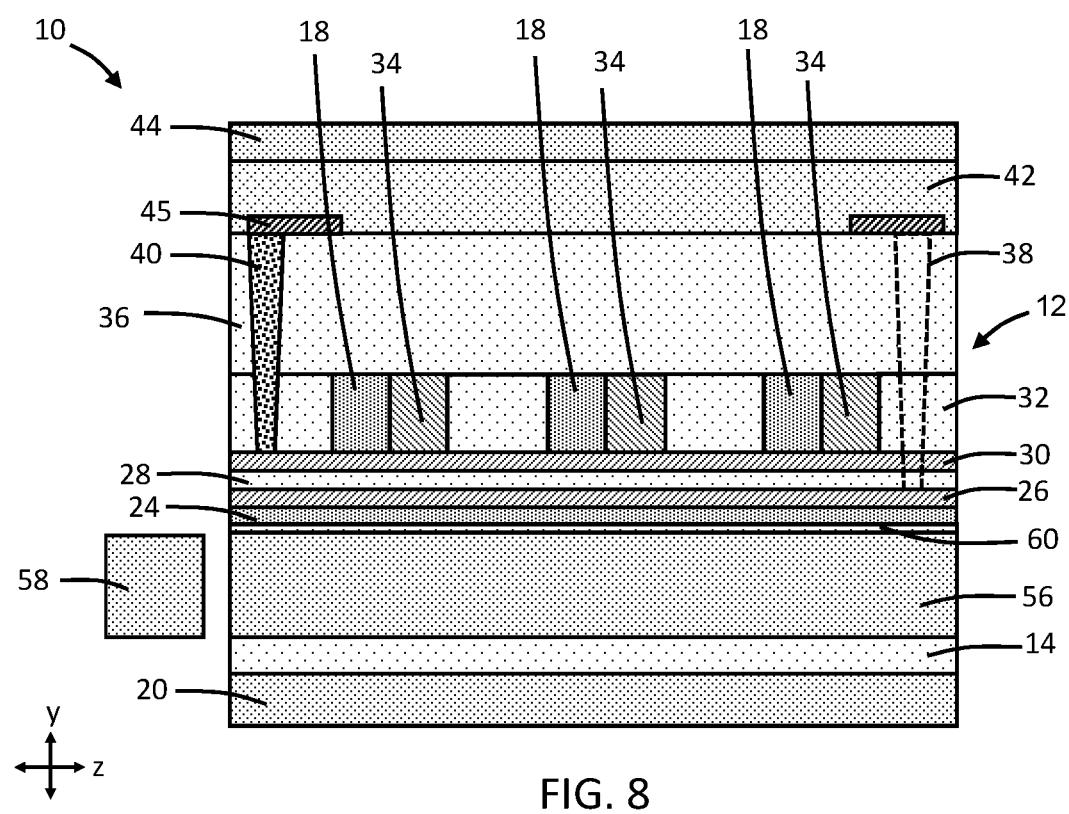

With reference to FIG. 8 in which like reference numerals refer to like features in FIG. 7 and in accordance with alternative embodiments of the invention, a semiconductor layer 56 may be arranged as a slab between the dielectric layer 14 and the grating coupler 12, and a waveguide 58 may route a stream of optical signals to the semiconductor layer 56 below the grating coupler 12. The semiconductor layer 56 and the waveguide 58 may be composed of a single-crystal semiconductor material, such as single-crystal silicon, that is patterned with lithography and etching processes. The semiconductor layer 56 and waveguide 58 may be utilized in any of the embodiments described herein as a replacement for the waveguide 16. A dielectric layer 60, which may be composed of a dielectric material such as silicon dioxide, may be formed between the semiconductor layer 56 and the grating coupler 12.

Figure 9:
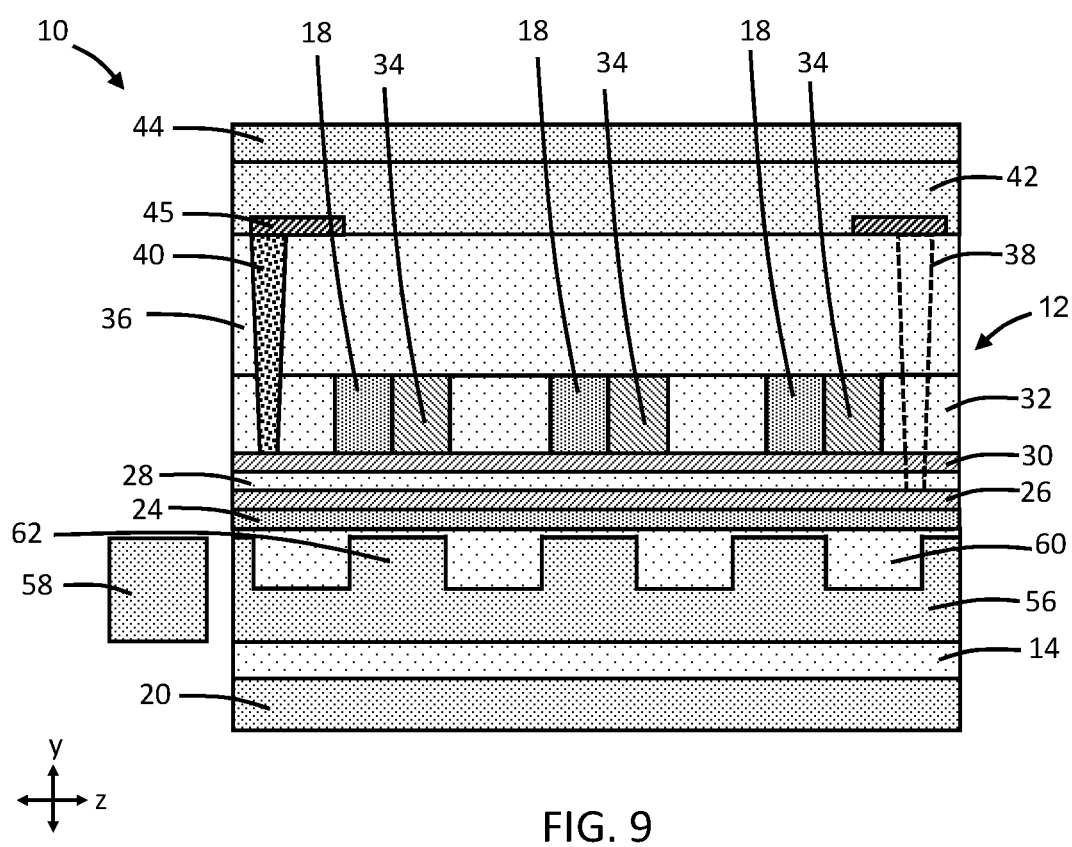

With reference to FIG. 9 in which like reference numerals refer to like features in FIG. 8 and in accordance with alternative embodiments of the invention, the semiconductor layer 56 may be patterned to include a set of ridges 62 that are arranged beneath the composite ridges of the grating coupler 12. In an embodiment, the ridges 62 may have a width that is equal or substantially equal to the composite width of each adjoined pair of the grating structures 18, 34, and a periodicity that is equal or substantially equal to the periodicity of the composite ridges provided by the grating structures 18, 34. Portions of the dielectric layer 60 fill the grooves between the ridges 62.

Figure 10:
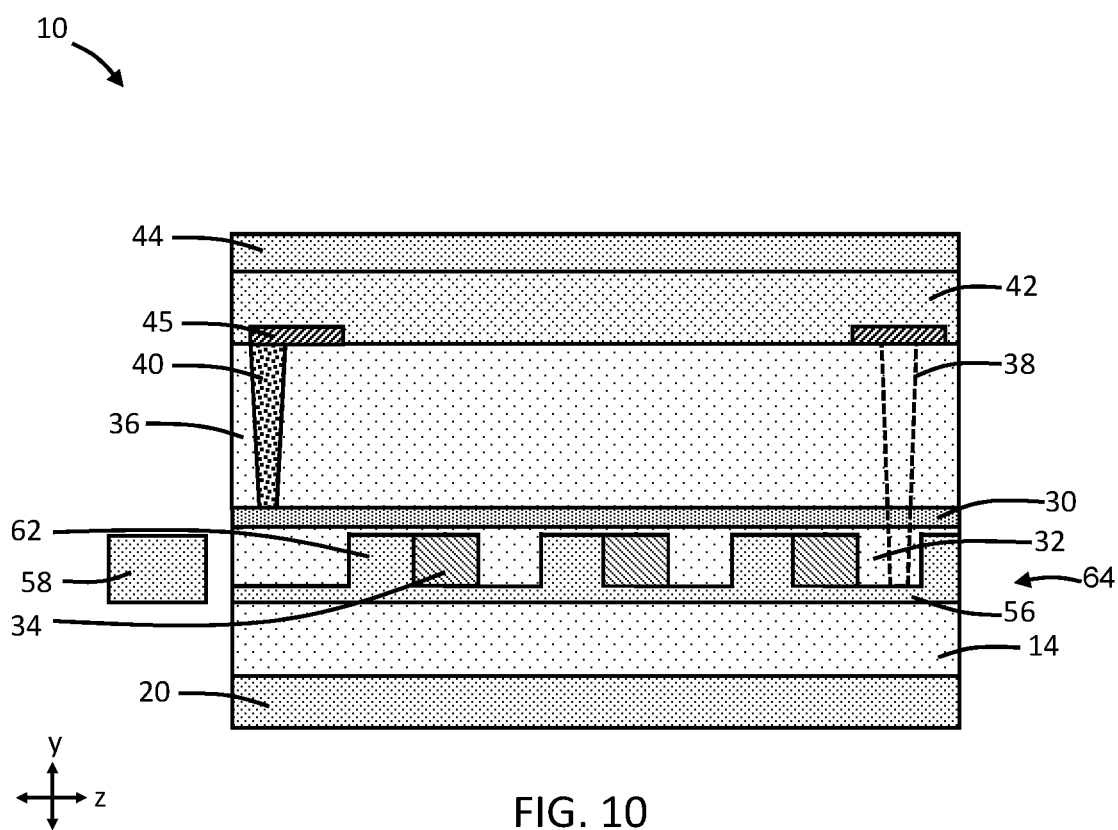

With reference to FIG. 10 in which like reference numerals refer to like features in FIG. 9 and in accordance with alternative embodiments of the invention, the ridges 62 may function as a grating coupler 64, and the grating coupler 12 may be omitted. The ridges 62 furnish an arrangement of grating structures that are separated by grooves and may be patterned by lithography and etching processes in the semiconductor layer 56. The ridges 62 and the grooves have an alternating arrangement, and the ridges 62 contain single-crystal semiconductor material, such as single-crystal silicon, originating from the patterned semiconductor layer 56. The dielectric layer 32 may be deposited and patterned to open a portion of each groove, as previously described, and the grating structures 34 may be formed inside the opened portions of the grooves between the ridges 62, as previously described, to form a set of hybrid or composite grating structures. The conductor layer 30 is positioned over the ridges 62 and grating structures 34, and the conductor layer 30 is coupled to the contact 40 to provide one of the electrical connections. However, an additional conductor layer may be omitted because the contact 38 may be directly coupled to the semiconductor layer 56 to provide the other electrical connection.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a grating coupler including a first plurality of grating structures and a second plurality of grating structures alternating with the first plurality of grating structures in an interleaved arrangement, the first plurality of grating structures comprised of a dielectric material, the second plurality of grating structures comprised of a tunable material having a refractive index that changes with an applied voltage, each of the second plurality of grating structures positioned in direct contact with one of the first plurality of grating structures in the interleaved arrangement to define a first plurality of ridges, and the first plurality of ridges alternate with a plurality of grooves; and
    a dielectric layer having a plurality of portions, each portion of the dielectric layer arranged in one of the grooves.

2. The structure of claim 1 wherein the tunable material is indium-tin oxide.

3. The structure of claim 1 wherein the tunable material is indium-tin oxide, vanadium oxide, germanium-antimony telluride, or a combination thereof.

4. The structure of claim 1 wherein the dielectric material is silicon nitride.

5. The structure of claim 1 further comprising:
    a first conductor layer positioned relative to the first plurality of grating structures and the second plurality of grating structures.

6. The structure of claim 5 wherein the first conductor layer is positioned in direct contact with the second plurality of grating structures.

7. The structure of claim 6 further comprising:
    a second conductor layer positioned relative to the first conductor layer,
    wherein the first conductor layer is positioned between the second plurality of grating structures and the second conductor layer.

8. The structure of claim 6 further comprising:
    a second conductor layer positioned relative to the first conductor layer,
    wherein the second plurality of grating structures are positioned between the first conductor layer and the second conductor layer.

9. The structure of claim 8 further comprising:
    a first dielectric layer over the first plurality of grating structures and the second plurality of grating structures;
    a first contact connected with the first conductor layer;
    a second contact connected with the second conductor layer; and
    a back-end-of-line stack over the first dielectric layer, the back-end-of-line stack including an interlayer dielectric layer and wires in the interlayer dielectric layer,
    wherein the first contact and the second contact are coupled with the wires in the back-end-of-line stack.

10. The structure of claim 5 wherein the first conductor layer is composed of the tunable material.

11. The structure of claim 1 wherein the first plurality of ridges and the portions of the dielectric layer are substantially coplanar.

12. The structure of claim 1 wherein the first plurality of ridges are arranged over a semiconductor layer, and the semiconductor layer includes a second plurality of ridges beneath the first plurality of ridges.

13. The structure of claim 12 wherein the first plurality of ridges and the second plurality of ridges have substantially equal pitches.

14. A method of forming a grating coupler, the method comprising:
    patterning a first layer to define a first plurality of grating structures and a plurality of grooves alternating with the first plurality of grating structures;
    forming a second plurality of grating structures that alternate with the first plurality of grating structures in an interleaved arrangement;
    depositing a dielectric layer to fill the grooves;
    patterning the dielectric layer to open a portion of each groove; and
    depositing a tunable material in the portion of each groove to form the second plurality of grating structures,
    wherein each of the second plurality of grating structures is positioned within one of the grooves, and the tunable material is comprised of a material having a refractive index that changes with an applied voltage.

15. The method of claim 14 further comprising:
    forming a first conductor layer positioned relative to the first plurality of grating structures and the second plurality of grating structures,
    wherein the first conductor layer is in direct contact with the second plurality of grating structures.

16. The method of claim 15 further comprising:
    forming a second conductor layer positioned relative to the first conductor layer,
    wherein the first conductor layer is positioned between the second plurality of grating structures and the second conductor layer.

17. The method of claim 15 further comprising:
forming a second conductor layer positioned relative to the first conductor layer,
wherein the second plurality of grating structures are positioned between the first conductor layer and the second conductor layer.

18. A structure comprising:
a grating coupler including a first plurality of grating structures and a second plurality of grating structures alternating with the first plurality of grating structures in an interleaved arrangement, the first plurality of grating structures comprised of a semiconductor material, the second plurality of grating structures comprised of a tunable material having a refractive index that changes with an applied voltage, each of the second plurality of grating structures positioned in direct contact with one of the first plurality of grating structures in the interleaved arrangement to define a first plurality of ridges, and the first plurality of ridges alternate with a plurality of grooves; and
a dielectric layer having a plurality of portions, each portion of the dielectric layer arranged in one of the grooves.

19. The structure of claim 18 wherein the tunable material is indium-tin oxide, vanadium oxide, germanium-antimony telluride, or a combination thereof.

20. The structure of claim 18 further comprising:
a conductor layer positioned over the first plurality of grating structures and the second plurality of grating structures;
a first dielectric layer over the first plurality of grating structures and the second plurality of grating structures;
a first contact connected with the conductor layer;
a second contact connected with the first plurality of grating structures; and
a back-end-of-line stack over the first dielectric layer, the back-end-of-line stack including an interlayer dielectric layer and wires in the interlayer dielectric layer,
wherein the first contact and the second contact are coupled with the wires in the back-end-of-line stack.

* * * * *